Jan. 17, 1950 F. BERRY 2,495,088
REVERSING FLUID MOTOR OF ROTARY ABUTMENT TYPE
Filed July 24, 1946. 5 Sheets-Sheet 1

INVENTOR.
FRANK BERRY
BY
Donald W. Robertson
ATTORNEY

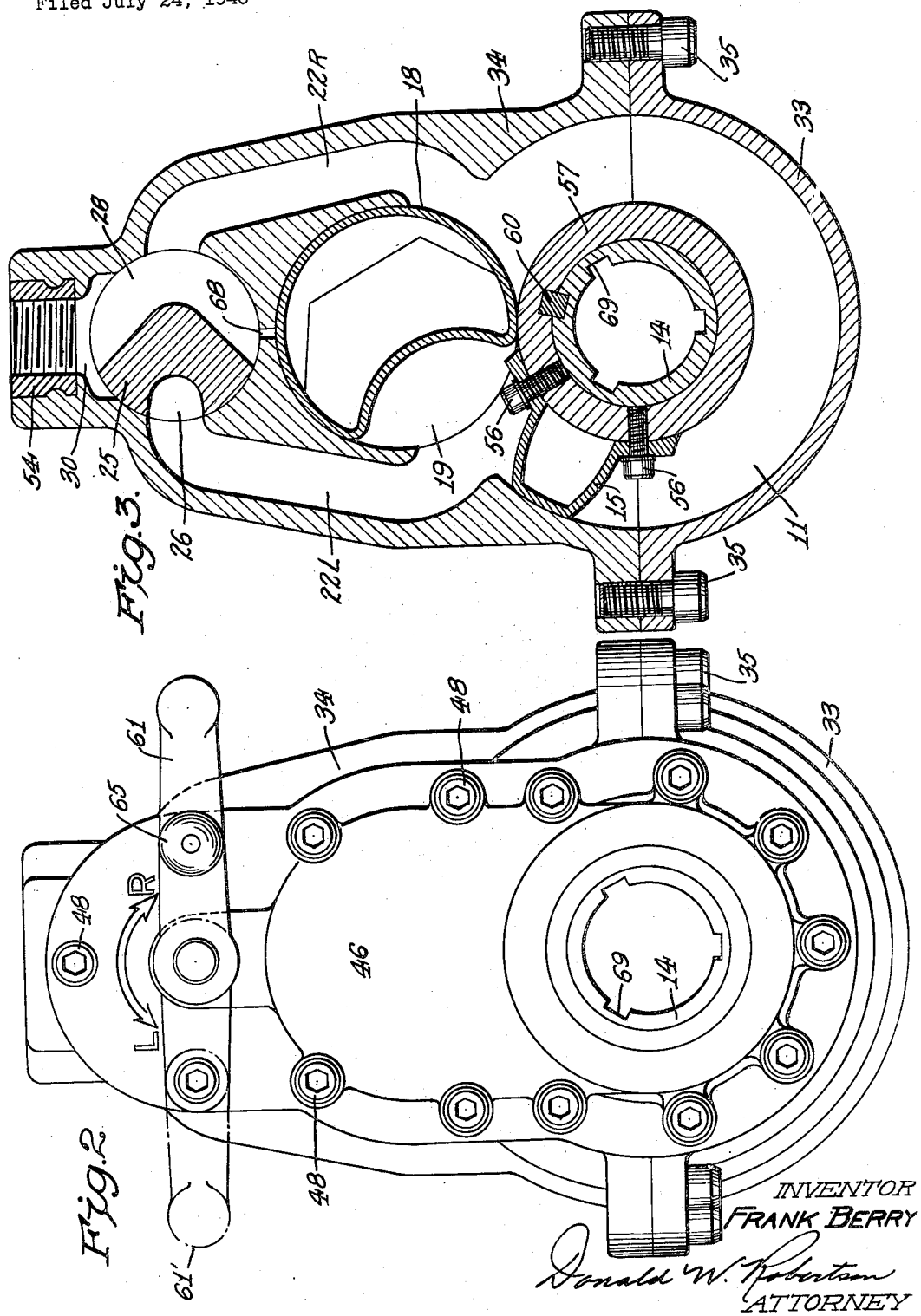

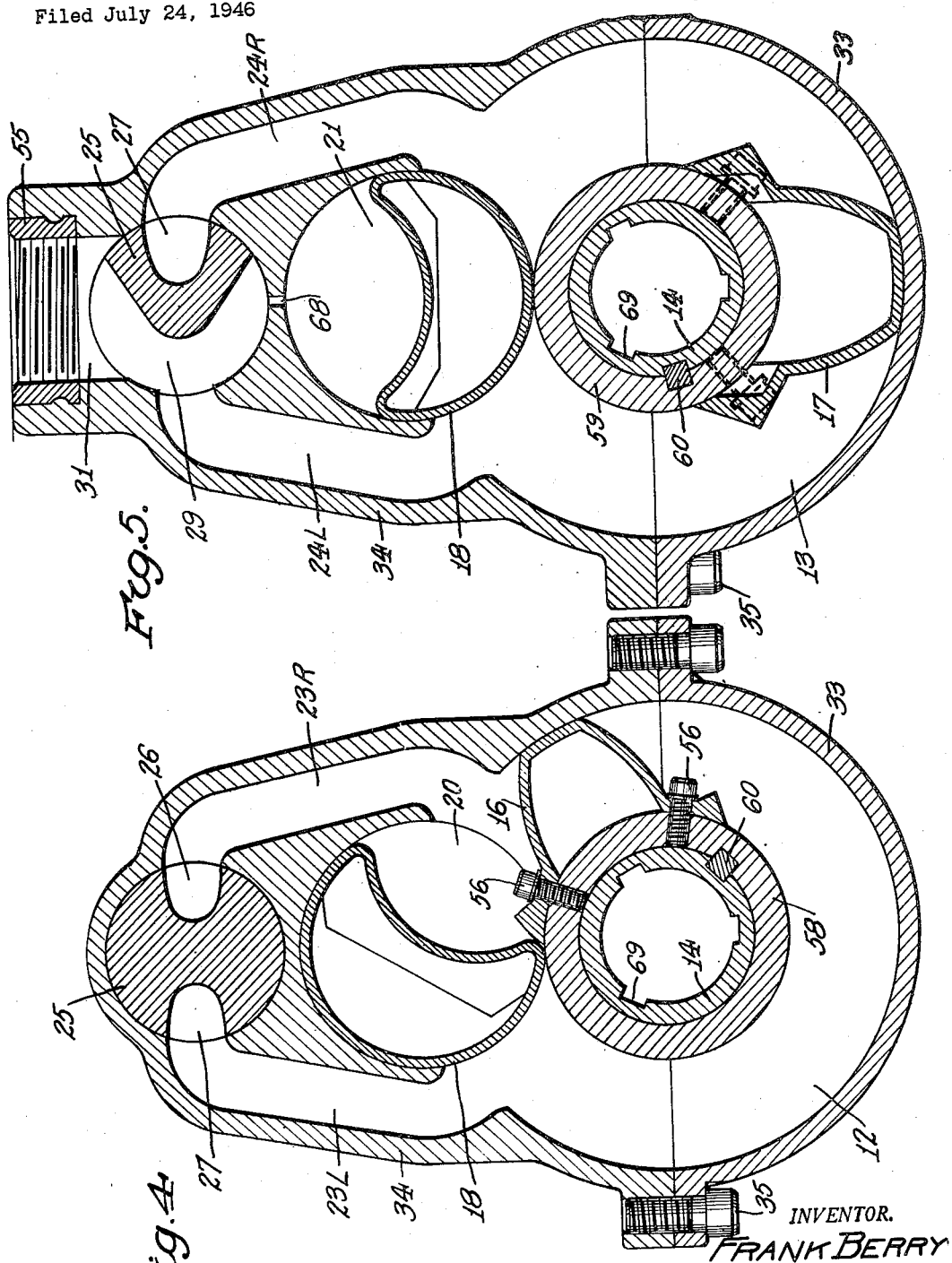

Jan. 17, 1950     F. BERRY     2,495,088
REVERSING FLUID MOTOR OF ROTARY ABUTMENT TYPE
Filed July 24, 1946     5 Sheets-Sheet 4
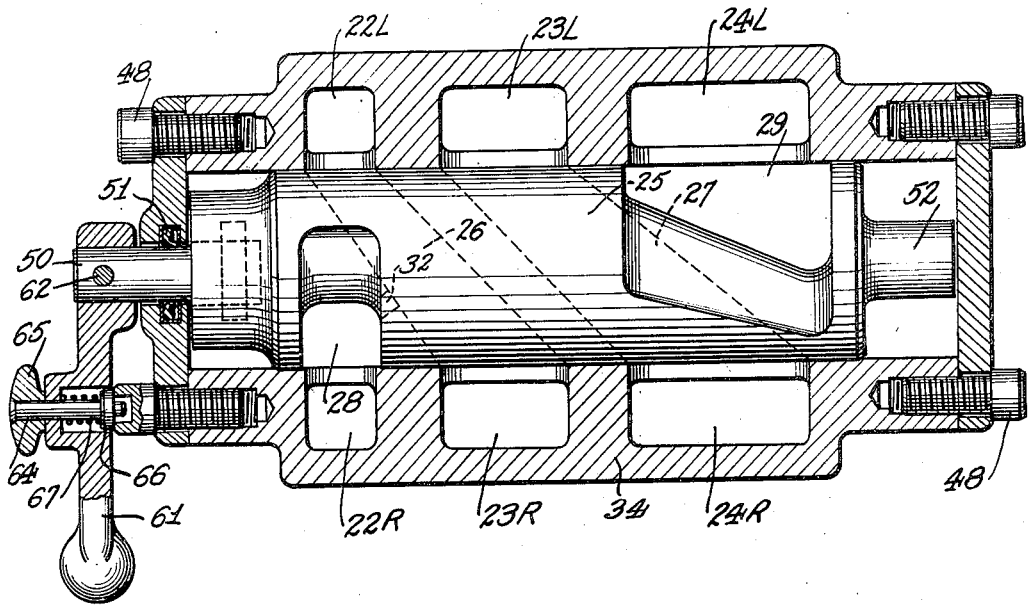
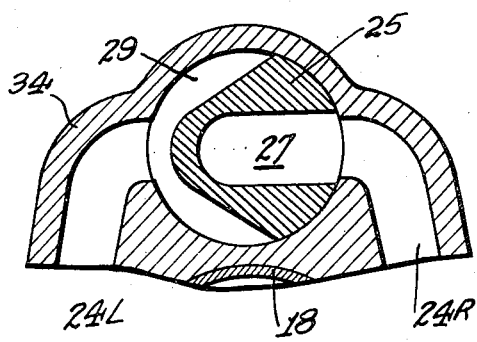
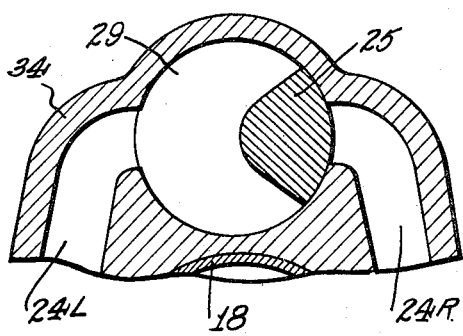
INVENTOR.
FRANK BERRY
BY
Donald W. Robertson
ATTORNEY

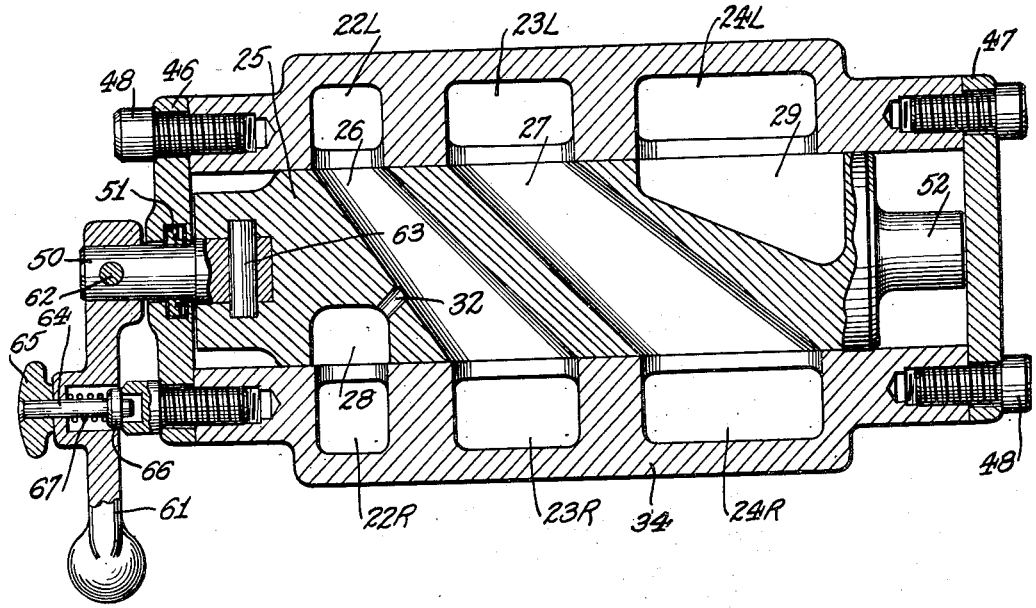
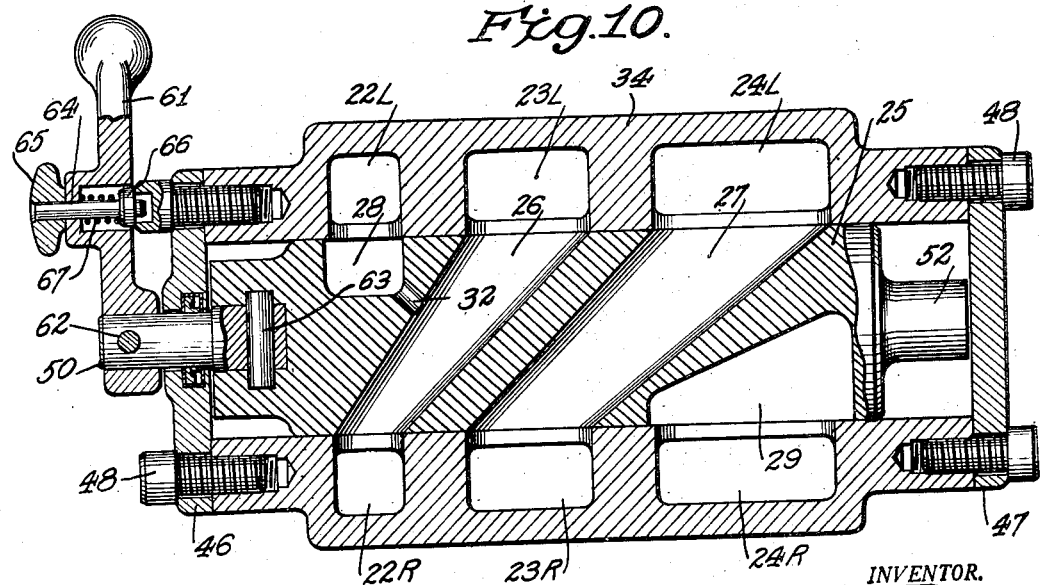

Patented Jan. 17, 1950

2,495,088

UNITED STATES PATENT OFFICE 2,495,088

REVERSING FLUID MOTOR OF ROTARY ABUTMENT TYPE

Frank Berry, Corinth, Miss.

Application July 24, 1946, Serial No. 686,005

4 Claims. (Cl. 121—72)

1

The invention relates to air motors or other fluid motors of the rotary abutment type, and particularly to reversing multi-stage motors.

It is a primary object of my invention to provide a multi-stage rotary abutment fluid motor which will run efficiently in forward and reverse, and in which left or right hand rotation of the driven shaft is determined by a simple unitary reversing valve which will be effective to change the direction of rotation of the shaft while feeding the operating fluid through the several stages in the same sequence for both directions of rotation.

A further object is to provide a motor of the characteristics described which also embodies a reversing mechanism having means for increasing starting torque effective in both forward and reverse without separate adjustment.

Other objects and advantages of my invention will appear as the description proceeds.

In the drawings:

Fig. 2 is an end elevation view of the same motor as seen at 2—2 in Fig. 1.

Figs. 3, 4 and 5 are vertical transverse sectional views taken as indicated at 3—3, 4—4 and 5—5, respectively, in Fig. 1, and showing the first, second, and third stage cylinders of the unit.

Fig. 6 is a detail horizontal sectional view taken as indicated at 6—6 in Fig. 1, with the rotary valve element shown in full top view.

Figure 1:
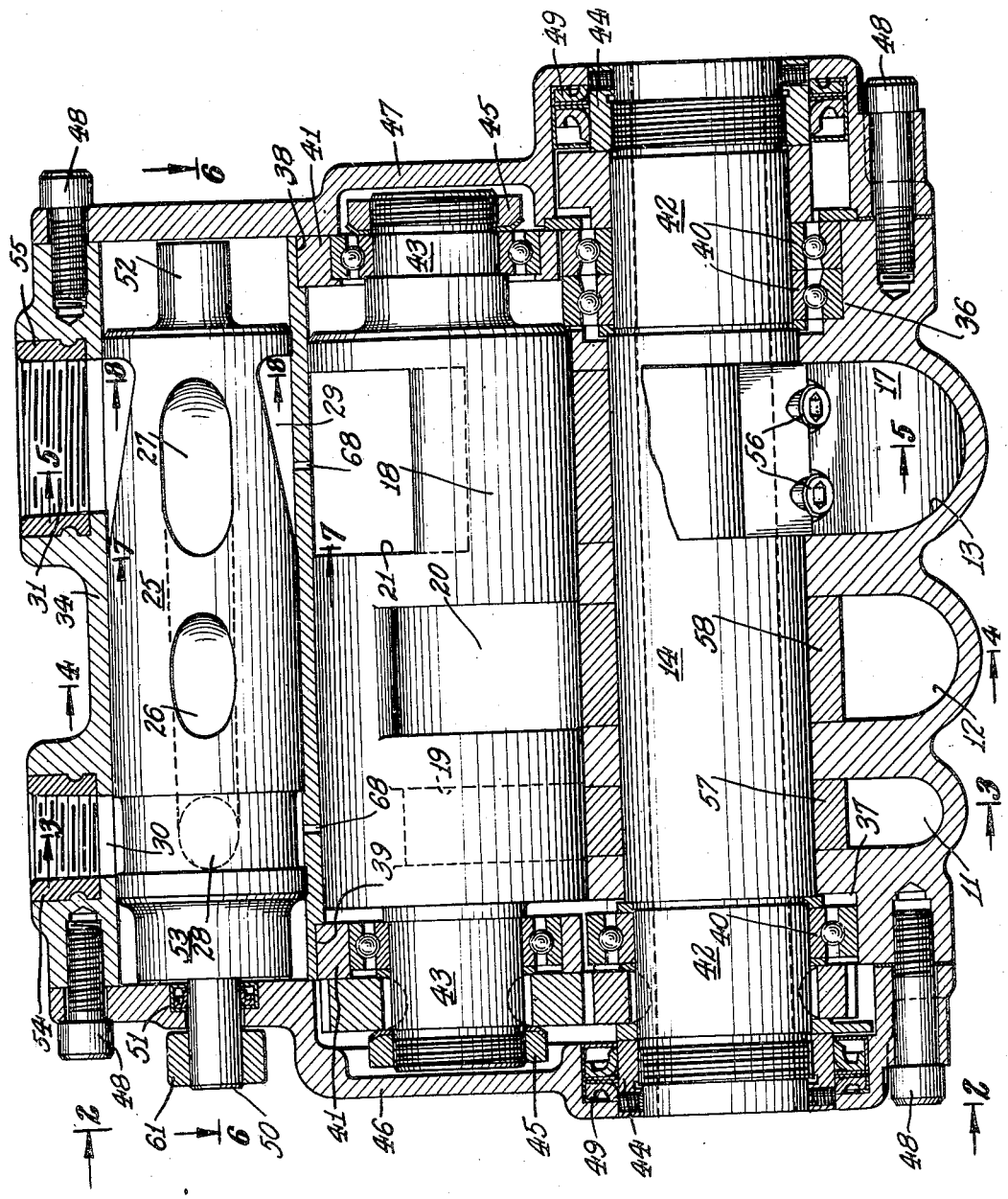
Fig. 1 is a central vertical longitudinal sectional view of a three-stage air motor embodying my invention in its preferred form.

Figs. 7 and 8 are detail vertical sectional views of the rotary valve and adjoining passages, taken on the lines 7—7 and 8—8, respectively, of Fig. 1.

Fig. 9 is a view similar to Fig. 6, but with the rotary valve element shown in section. The position of the parts is that which will produce right hand rotation of the driven shaft, i. e., clockwise as viewed in Figs. 2, 3, 4 and 5.

Fig. 10 is a view similar to Fig. 9, except that the position of the parts is that which will produce left hand rotation of the driven shaft, i. e., counter-clockwise as viewed in Figs. 2, 3, 4 and 5.

My invention comprises, in its general arrangement, annular cylinders 11, 12 and 13 arranged about a common shaft 14 in axial alignment, pistons 15, 16 and 17 in the respective cylinders fixed for rotation with the shaft, an abutment rotor 18 parallel to the shaft having recesses 19, 20 and 21 to clear the pistons as they pass the abutment rotor, a pair of opposed passages communicating with each cylinder at opposite sides of the abutment (22L and 22R—first stage, 23L and 23R—second stage, 24L and 24R—third stage), a rotary valve element 25 formed with passageways 26, 27 extending diagonally thereacross, each passageway arranged to connect an outlet passage of one cylinder to an in-

2 let passage of an adjacent cylinder for either direction of rotation of the shaft and pistons so that, characterizing the opposed passages of each cylinder as "left" and "right," the rotary valve cylinder as "left" and "right," the rotary valve element is settable to a position (Fig. 9) wherein one of the diagonal passageways 26 connects the left passage 22L of one cylinder to the right passage 23R of a second cylinder, and wherein another of the diagonal passageways 27 connects the left passage 23L of the second cylinder to the right passage 24R of a third cylinder, the rotary valve element also being settable to a position (Fig. 10) wherein the first diagonal passageway 26 connects the right passage 22R of the first cylinder to the left passage 23L of the second cylinder, and wherein the second diagonal passageway 27 connects the right passage 23R of the second cylinder to the left passage 24L of the third cylinder.

The rotary valve element 25 has two passageways 28, 29 extending thereacross, one to connect selectively the right and left passages 22R and 22L of the first stage cylinder to an inlet duct 30 and the other to connect selectively the left and right passages of the last stage cylinder to an outlet duct 31 according to the respective described settings of the rotary valve element.

It will be observed that the valve passageways 26 and 27 are arranged in overlapping relationship with their adjacent ends substantially opposite one another, whereby the valve element 25 can be set in either of the two selected positions illustrated in Figs. 9 and 10 in which said adjacent ends of the passageways are in communication with the pair of opposed passages 23L and 23R. It will further be observed that the outer end of each diagonal passageway 26, 27 is substantially opposite one of the end passages 28, 29. End passageway 28 is formed as a recess in the exterior of the valve element, this recess being so constructed as partially to surround the adjacent diagonal passageway 26 as will be clear from Fig. 3 of the drawings. Similarly the other end passageway 29 is formed as a recess in the exterior of the valve element, this recess being so constructed as partially to surround the adjacent diagonal passageway 27, as will be apparent from examination of Fig. 5. A feature of this particular construction is that it permits alternate connection of the inlet and outlet ports to left and right hand passages arranged opposite one another.

In my preferred construction a small opening 32 provides direct communication between end passageway 28 and the first diagonal passageway 26. When the motor is first started high pressure air directly enters the high pressure or first stage cylinder 11 through passage 22R or 22L as the case may be. Also high pressure air directly enters the second stage cylinder 12 via the opening 32 aforesaid, thus raising the pressure in the second stage cylinder and increasing the torque of the motor for starting and for low speed operation. At high speeds the velocity of the air through the passages is so great that only a small quantity of the high pressure air passes through the opening 32 in proportion to the amount which reaches the second stage cylinder via the outlet passage of the first stage cylinder. Thus my reversing mechanism provides means for increasing the starting torque and low speed torque effective in both forward and reverse without separate adjustment.

It will be appreciated that my reversing mechanism is applicable to motors having a fewer or greater number of cylinders than in the preferred embodiment illustrated; also that the construction of the motor may be modified in other respects. However in order that my invention may be fully understood in its preferred embodiment, I shall now describe this particular construction in somewhat greater detail.

The lower parts of the annular cylinders 11, 12 and 13 are formed in the bottom casing member 33 and the upper parts in the top casing member 34. The two casing members are joined together at the center line of the shaft 14 by means of suitable flanges bolted together as at 35. Top casing member 34 also houses the rotary abutment 18 and the rotary valve element 25. The two casing members are counterbored at 36, 37, 38, 39 to receive bearing members 40 and bearing rings 41 for the motor shaft 14 and rotary abutment 18 respectively. The ends of the shaft and rotary abutment are offset to smaller diameter at their ends as at 42 and 43, and are threaded to receive nuts 44, 45 with suitable lock washers or set screws as shown. End casing members 46 and 47 complete the casing assembly, these members being secured to the top and bottom casing members by suitable stud bolts 48. End casing members 46 and 47 are bored to receive the motor shaft 14 and counter-bored to receive packing glands 49. End casing member 46 is also bored to receive the end 50 of rotary valve element 25 and counterbored to receive a packing gland 51 therefor. The ends 52, 53 of valve element 25 are of reduced diameter and abut the end casing members 46 and 47. Interiorly threaded coupling members 54 and 55 may be cast into the top casing member 34 for connection respectively to inlet and outlet pipes (not shown).

The pistons 15, 16 and 17 are bolted, as at 56, or otherwise secured to rotor rings 57, 58, 59 keyed at 60 to the shaft 14, these rings being of the same width as the respective cylinders, as will be clear from Fig. 1, and being of the same thickness as the top wall of the shaft opening in the top casing member 34 so as to have rolling contact with the rotary abutment 18, as shown in Figs. 1, 3, 4 and 5.

The position of the rotary valve element 25 is controlled by reversing lever 61 which is keyed to the stub shaft 50 as by a pin 62. Stub shaft 50 may be cast in place in the valve element 25 to which it is locked by a pin 63 (Figs. 9 and 10). A lock pin 64 fastened to a knob 65 provides means for holding the reversing lever in the desired position. This locking pin passes through an opening in the lever 61 and is formed with a collar 66 near its inner end arranged to seat against the end of one or more of the stud bolts 48 with its inner end projecting into the wrench opening therein. A coil spring 67 surrounding the lock pin 64 bears at one end against the bottom of the recess in the lever 61 and at its other end against the collar 66, urging the pin into its locking position and permitting its retraction by means of the knob 65 when the motor is to be reversed.

The chambers in the top casing member 34 which receive the valve plug 25 and rotary abutment 18 are connected by small openings 68 (Figs. 1, 3 and 5). These openings serve a two-fold purpose, draining the oil that may accumulate in the valve chamber and equalizing the air pressure on the valve so that it can be turned easily for reversing the motor.

Notches or grooves 69 on the inside of the hollow shaft 14 provide for connection to the shaft of the apparatus which is to be driven by the motor.

The position of the parts, as shown in all of the views, excepting Fig. 10, corresponds to the setting for forward operation of the motor, i. e. right hand or clockwise rotation of the driven shaft 14 as viewed in Figs. 2, 3, 4, and 5. The position shown in Fig. 10 and indicated in dot-dash lines at 61' in Fig. 2, is that which will produce reverse operation of the motor, i. e. left hand or counter-clockwise rotation of the driven shaft 14.

With the valve 25 in the right hand position shown in Fig. 9, operation is as follows: High pressure air enters the unit through the inlet 30, traverses passageway 28 of the valve, passage 22R, of the first stage cylinder, entering cylinder 11, carrying piston 15 around in a clockwise direction. After this piston advances slightly beyond the position shown in Fig. 3 and begins to enter recess 19 in the rotary abutment, the expanding air in cylinder 11 flows through passage 22L, from which it flows through passageway 26 of the valve (Fig. 9) and passage 23R leading into the second stage cylinder (Fig. 4), the piston 16 of which is 120° in advance of the first stage piston. After piston 16 passes the end of passage 23L, the air which was behind the piston 16 expands through passage 23L from which it flows through passageway 27 (Fig. 9) into passage 24R of the third stage cylinder (Fig. 5), the piston 17 of which is 120° in advance of the piston 16 of the second stage piston. Air exhausting from the third stage cylinder flows through passage 24L and across end passageway 29 of the valve 25 into the outlet 31.

With the lever 25 in the position shown in Fig. 10, flow through the motor is as follows: Inlet 30, transverse passageway 29, passage 22L, cylinder 11, passage 22R, passageway 26, passage 23L, cylinder 12, passage 23R, passageway 27, passage 24L, cylinder 13, passage 24R, transverse passageway 29, outlet 31.

It will be observed that the direction of rotation of the motor shaft is reversed by simply moving the lever 61 from the position shown in Fig. 9 to that shown in Fig. 10 or vice versa, and that the operating fluid always flows through the several stages in the same sequence, that is, the air expands sequentially through cylinders 11, 12 and 13 for both directions of rotation. The reversing valve itself embodies means for increasing the starting torque and the torque at low speeds which is effective in both forward and reverse without separate adjustment.

The terms and expressions which I have employed are used in a descriptive and not a limiting sense, and I have no intention of excluding such equivalents of the invention described, or of portions thereof, as fall within the purview of the claims.

I claim:

1. A rotary-piston motor comprising annular cylinders arranged about a common shaft in axial alignment, a piston in each cylinder fixed for rotation with the shaft, an abutment rotor parallel to the shaft having recesses to clear the pistons as they pass the abutment rotor, a pair of opposed passages communicating with each cylinder at opposite sides of the abutment, each of said opposed passages serving either as an inlet or outlet passage in accordance with the selected direction of rotation of the shaft and pistons, a rotary valve element formed with a passageway extending diagonally thereacross and arranged to connect an outlet passage of one cylinder to an inlet passage of an adjacent cylinder for either direction of rotation of the shaft and pistons so that, characterizing the opposed passages of each cylinder as "left" and "right", the rotary valve element is settable to a position wherein the diagonal passageway connects the left passage of one cylinder to the right passage of the adjacent cylinder, and is also settable to a position wherein the diagonal passageway connects the right passage of said one cylinder to the left passage of said adjacent cylinder, the rotary valve element having another passageway extending thereacross to connect selectively the right and left passages of said one cylinder to an inlet duct according to the respective described settings of the rotary valve element, and having a small opening between said other passageway and the diagonal passageway to provide direct communication therebetween.

2. A rotary-piston motor comprising annular cylinders arrange about a common shaft in axial alignment, a piston in each cylinder fixed for rotation with the shaft, an abutment rotor parallel to the shaft having recesses to clear the pistons as they pass the abutment rotor, a pair of opposed passages communicating with each cylinder at opposite sides of the abutment, each of said opposed passages serving either as an inlet or outlet passage in accordance with the selected direction of rotation of the shaft and pistons, a rotary valve element formed with passageways extending diagonally thereacross, each passageway arranged to connect an outlet passage of one cylinder to an inlet passage of an adjacent cylinder for either direction of rotation of the shaft and pistons so that, characterizing the opposed passages of each cylinder as "left" and "right", the rotary valve element is settable to a position wherein one of the diagonal passageways connects the left passage of one cylinder to the right passage of a second cylinder and wherein another of the diagonal passageways connects the left passage of the second cylinder to the right passage of a third cylinder, the rotary valve element also being settable to a position wherein the first diagonal passageway connects the right passage of the first cylinder to the left passage of the second cylinder and wherein the second passageway connects the right passageway of the second cylinder to the left passageway of the third cylinder, the rotary valve element having another passageway extending thereacross to connect selectively the right and left passageways of the first cylinder to an inlet duct according to the respective described settings of the rotary valve element, and having a small opening between said other passageway and that diagonal passageway which connects passages of the first and second cylinders to provide direct communication between said other passageway and said last-named diagonal passageway.

3. A rotary-piston motor comprising annular cylinders arranged about a common shaft in axial alignment, a piston in each cylinder fixed for rotation with the shaft, an abutment rotor parallel to the shaft having recesses to clear the pistons as they pass the abutment rotor, a pair of opposed passages communicating with each cylinder at opposite sides of the abutment, each of said opposed passages serving either as an inlet or outlet passage in accordance with the selected direction of rotation of the shaft and pistons, an inlet duct adjoining the pair of opposed passages for the cylinder at one end of the motor and an outlet duct adjoining the pair of opposed passages for the cylinder at the other end of the motor, and a rotary valve element formed with passageways extending diagonally thereacross and end passageways extending thereacross at each side of said diagonal passageways, the several passageways being arranged in overlapping relationship so that the inner ends of the diagonal passageways are substantially opposite one another and the outer end of each diagonal passageway is substantially opposite one of said end passages, the end passageways of the rotary valve element being formed as recesses in the exterior of the valve element, such recesses extending on both sides of the adjacent diagonal passageways so as partially to surround them.

4. A rotary-piston motor comprising annular cylinders arranged about a common shaft in axial alignment, a piston in each cylinder fixed for rotation with the shaft, an abutment rotor parallel to the shaft having recesses to clear the pistons as they pass the abutment rotor, a pair of opposed passages communicating with each cylinder at opposite sides of the abutment, each of said opposed passages serving either as an inlet or outlet passage in accordance with the selected direction of rotation of the shaft and pistons, a rotary valve element formed with a passageway extending diagonally thereacross and arranged to connect an outlet passage of one cylinder to an inlet passage of an adjacent cylinder for either direction of rotation of the shaft and pistons so that, characterizing the opposed passages of each cylinder as "left" and "right," the rotary valve element is settable to a position wherein the diagonal passageway connects the left passage of one cylinder to the right passage of the adjacent cylinder, and is also settable to a position wherein the diagonal passageway connects the right passage of said one cylinder to the left passage of said adjacent cylinder, the diagonal passageway being of progressively increasing cross-sectional area throughout its length.

F. BERRY.

REFERENCES CITED

The following references are of record in the file of this patent:

UNITED STATES PATENTS

| Number | Name | Date |
|---|---|---|
| 655,609 | Cooper | Aug. 7, 1900 |
| 785,408 | Cooper | Mar. 21, 1905 |

Certificate of Correction

Patent No. 2,495,088 January 17, 1950

FRANK BERRY

It is hereby certified that errors appear in the printed specification of the above numbered patent requiring correction as follows:

Column 1, line 25, for the word "elevation" read *elevational*; column 5, line 16, strike out the syllable and hyphen "con-"; line 38, for "arrange" read *arranged*; lines 66 and 67, for "passageway" read *passage*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*